United States Patent [19]

Coles

[11] Patent Number: 4,841,870
[45] Date of Patent: Jun. 27, 1989

[54] MOTOR VEHICLE TURNTABLE

[75] Inventor: Kenneth G. Coles, Sydney, Australia

[73] Assignee: K.G. Coles & Co. Pty. Limited, Australia

[21] Appl. No.: 3,426

[22] PCT Filed: Apr. 30, 1986

[86] PCT No.: PCT/AU86/00117
§ 371 Date: Dec. 5, 1986
§ 102(e) Date: Dec. 5, 1986

[87] PCT Pub. No.: WO86/06336
PCT Pub. Date: Nov. 6, 1986

[30] Foreign Application Priority Data
May 2, 1985 [AU] Australia .............................. PH0402

[51] Int. Cl.[4] ........................................... B60S 13/02
[52] U.S. Cl. ........................................ 104/44; 104/47
[58] Field of Search ................ 104/35, 36, 40, 42, 104/44, 47

[56] References Cited
U.S. PATENT DOCUMENTS

| 1,665,997 | 4/1928 | Austin . | |
|---|---|---|---|
| 2,135,924 | 11/1938 | Toews | 104/41 |
| 3,170,411 | 2/1965 | Howard | 104/40 |
| 3,583,326 | 6/1971 | Poissant | 104/35 |
| 3,713,549 | 1/1973 | Routhier | 104/37 X |
| 3,888,184 | 6/1975 | Maeda | 104/37 |
| 4,562,774 | 1/1986 | Dehring | 104/44 X |
| 4,676,171 | 6/1987 | Kelderman | 104/47 X |

Primary Examiner—Johnny D. Cherry
Assistant Examiner—Russell D. Stormer
Attorney, Agent, or Firm—Beveridge, DeGrandi & Weilacher

[57] ABSTRACT

A vehicle turntable has a rotatable vehicle support which is supported on a base for rotation about an axis which is inclined relative to orthogonal vertical planes. The rotatable assembly carries a detent which is releasably engageable with slots at spaced intervals around the periphery of an arcuate member which is mounted for limited rotation about the turntable axis. A spring urges the arcuate member in a direction which is opposite to the direction of turntable rotation, a motion damping device is connected to the arcuate member.

9 Claims, 3 Drawing Sheets

MOTOR VEHICLE TURNTABLE

FIELD OF THE INVENTION

This invention relates to turntables of the kind described in Australian Pat. No. 539404, in which the turntable has an axis of rotation which is inclined relative to two orthogonal planes, so that rotation of the turntable is achieved by utilising the weight of the vehicle.

BACKGROUND ART

In the embodiment described in the abovementioned Australian patent, the turntable in braked automatically upon turning through 180° by the engagement of a braking blade with a retaining slot in a member mounted for linear movement against a compression spring in a recoil device fixed beneath the turntable.

SUMMARY OF THE INVENTION

Among the objects of the present invention are the provision of a braking and locking system which provides operational advantages over that described in the abovementioned Australian patent, and a mode of construction which offers advantages in the manner of manufacture and installation of the turntable. The invention broadly resides in a motor vehicle turntable comprising rotatable vehicle support means the axis of rotation of which is inclined relative to othorgonal vertical planes and brake means for arresting the rotation of said turntable, characterised in that said brake means comprises detent engagement means at spaced arcuately disposed locations concentric with said axis, and detent means rotating with the turntable for braking engagement with said engagement means.

Reference will now be made to the accompanying drawings, in which an embodiment of the invention is shown by way of example only.

DESCRIPTION OF PREFERRED EMBODIMENTS OF THE INVENTION

Figure 1:
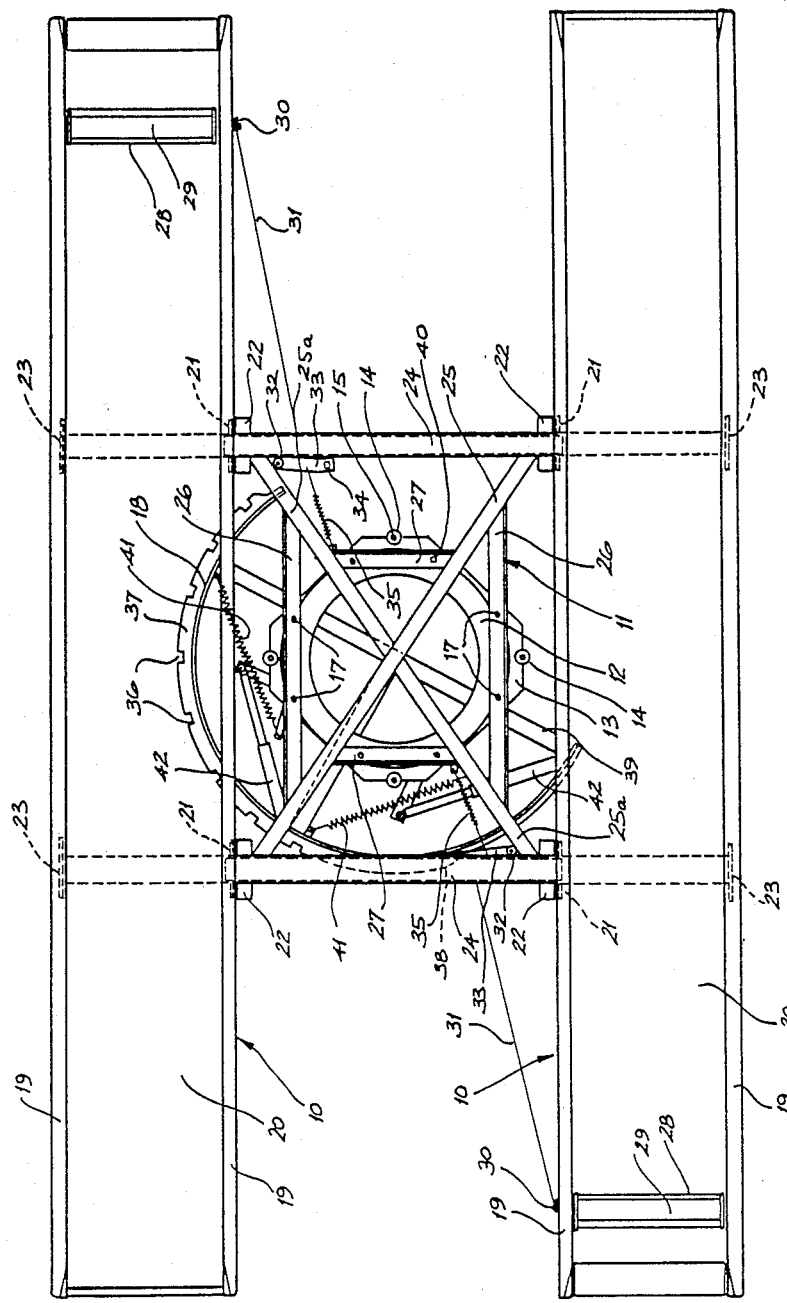
FIG. 1 is a plan view of a turntable embodying the present invention, with components partly broken away to show the mounting structure and operating mechanism.
Figure 2:
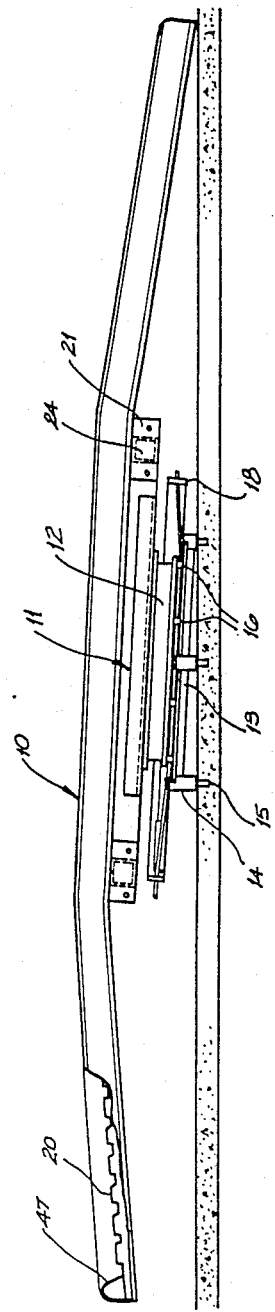
FIG. 2 is a side elevation of the turntable of FIG. 1.

The turntable illustrated in FIGS. 1 and 2 comprises a pair of runways 10, mounted on a centre frame assembly 11, which is in turn mounted on a slew ring 12 for rotation on a base plate 13.

As shown in FIG. 2, the base plate 13 is mounted on a surface such as a concrete driveway or garage floor by means of bosses 14, and fixed by masonry anchors 15 which pass through these bosses. The height of each of the bosses 14 differs, and is chosen so as to tilt the axis of rotation of the turntable to achieve the operation described in the abovementioned patent specification. It is found that a slope of the base from one side to the other of 1 in 40, combined with a slope from rear to front of 1 in 20, provides satisfactory action. The base plate 13 is provided at its centre with a boss, not visible in the drawings, with a central hole for locating the bottom end of the pivot pin of the toothed segment bar 18 described below.

The slew ring 12, which may be a substantially unmodified slew ring as manufactured for articulated vehicles, is separated from the base plate 13 by spacers 16, which are drilled to receive bolts 17 by which the slew ring is fixed to the base plate. The purpose of this spacing is to provide for the location between the base plate and the slew ring, of a toothed segment bar 18, described in detail below, which is pivoted on the central pivot pin of the turntable.

Each runway comprises a pair of steel channel sections 19 which form the sides of the runway, and a deck 20 consisting of roll-formed steel decking of suitable profile such as that shown in FIG. 2.

The runways are fixed to the centre frame assembly by means of plates 21 welded to and extending downwardly from each channel section 19, these plates 21 being fixed to angle members 22 and plates 23 carried by a pair of cross-members 24 of the assembly 11.

The centre frame assembly 11 consists of the cross-members 24, a diagonal member 25 an a pair of diagonal members 25a, side members 26 and lateral members 27, these components being prefabricated as a rigid supporting assembly and fixed in situ to the slew ring 12 by means of bolts 40 passing through the members 26 and 27.

At opposite ends of the runways 10 there are provided trip bars 28, mounted on shafts 29, such that the a bar 28 will be depressed by one of the front wheels of a car driven on to the turntable when the car is fully positioned on the turntable. The trip bars 28 are spaced from each other in the longitudinal direction of the turntable by a distance sufficient to ensure that they will not simultaneously be depressed by the front and rear wheels of the vehicle which is to use the turntable. On the inner end of each shaft 29, inboard of the respective runway, there is mounted a crank 30, and connected to the crank 30 is a cable 31 which transfers the motion of the trip bar 28 to the brake mechanism which will now be described.

Mounted by means of a pin within a boss 32 at diagonally opposite junctions of members 25a and 26 is a catch release plate 33, and depending downwardly from the plate 33 is a detent lug 34. The cable 31 is attached to the plate 33, so that depression of the associated trip bar 28 will draw the detent lug 34 away from the segment bar 18, against the action of a return spring 35.

The segment bar 18 is provided along its arcuate periphery with regularly spaced slots 36 in a flange 37 which extends over the major part of the circumference of the bar, the flange 37 joining the remainder of the bar periphery by a ramp 38.

As noted above the segment bar 18 is mounted for rotation on the centre pivot of the turntable. This rotation is limited by the abutment of the cross-member 39 of the segment bar against the bolts 40, and is restrained in the clockwise direction as seen in the drawings, by a pair of return springs 41 extending between the segment bar and the base plate 13. The clockwise direction as viewed in the drawings is, of course, the direction of rotation of the turntable, the direction of approach to the turntable being from the right.

Also mounted between the segment bar 18 and the base plate 13 are a pair of gas-filled shock absorbers 42.

The operation of the turntable thus far described is as follows. The normal position of the turntable, aligned with the driveway (not shown) is that illustrated in FIG. 1. The detent lug associated with the trip bar at the left hand end of the turntable is engaged with the first slot 36. The opposite lug is free of the segment bar, being beyond its end, so that as the car is driven on to the turntable the depression of the right hand trip bar will have no effect.

When the car reaches a position where the forward trip bar is depressed, this will be felt by the driver as the front wheel engages a raised portion 47 at the end of the runway 10. The associated detent lug will be drawn from its engagement in the first slot of the segment bar, and the turntable wil rotate. As described in the abovementioned patent specification, this rotation occurs without any motive power other than the weight of the vehicle itself. Due to the disposition of the axis of turntable rotation, that portion of the car beyond and above the bearing will exceed the weight of the portion of the car below the bearing. Thus, the turntable will rotate, in this case in a clockwise direction as viewed in the drawings.

As the turntable approaches a position 180° from its starting point, the detent lug 34 at the end of the turntable carrying the rear of the car approaches and rides up the ramp 38 and enters the first of the slots 36. The turntable will now be stopped as its energy is absorbed by the springs 41 and the shock absorbers 42.

Should it be required to stop the turntable during its rotation and before it has completed one half revolution, the driver must reverse slightly to release the trip bar 28, whereupon the lug 34 will enter the next slot 36, braking the turntable as before. In the illustrated embodiment, with a segment bar of 1300 mm. diameter, the slots 36 are spaced at intervals of 150 mm., and this is found to provide adequate emergency stopping performance. It will be observed that the flange 37 extends for somewhat less than 180°, since the last emergency brake slot need be just short of opposite the first, normal braking slot.

Figure 3:
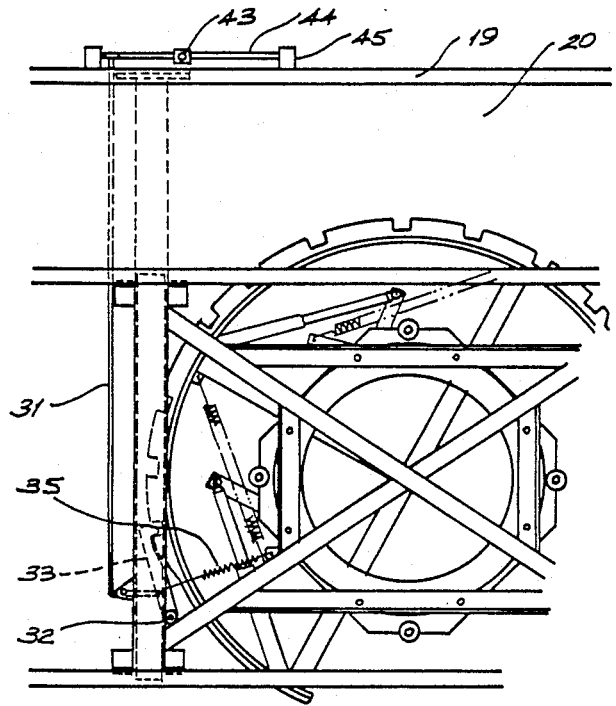
FIG. 3 is a fragmentary plan view of components of a modified braking mechanism.
Figure 4:
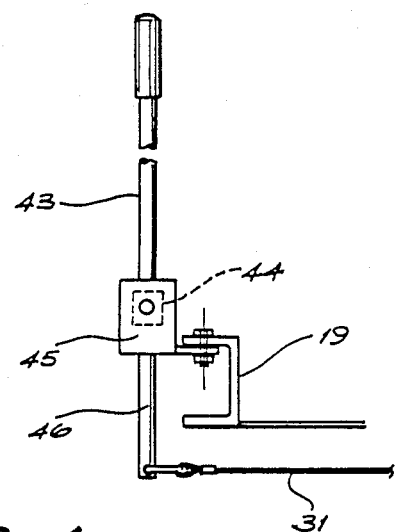
FIG. 4 is a fragmentary front elevation of the mechanism of FIG. 3.

An alternative approach to brake operation is illustrated in the fragmentary views of FIGS. 3 and 4. In this embodiment, braking and brake release are carried out manually. This provides the user with a greater sense of control over the operation of the turntable, and also provides for a quicker response to an emergency situation. The manual arrangement also enables the turntable to be used in a situation where on occasions it may be desired to drive off the end of the turntable without it rotating or back off after rotating.

In this embodiment the trip bars are dispensed with, and each is replaced by a handle 43, mounted on a bar 44 which is journalled at its ends in brackets 43 fixed to the outer side of the runway. The handle is attached to the adjacent cable 31 by a lug 46, so that movement of the handle towards the car will release the lug 34.

When the car is driven on to the runways and is in the correct position, the handle 43 will be readily accessible outside the driver's window. The driver may cause the turntable to rotate through one half revolution by holding the handle towards him in the released position until the lug 34 associated with the other end of the turntable enters the first braking slot 36. In the event of an emergency, such as a child running into the path of the swinging turntable, release of the handle will enable immediate braking to be achieved.

If the turntable is installed with a raised drive-off area at the end opposite the entry end, so that the driver has the option of turning his vehicle on the turntable or continuing off the turntable without turning, then in the latter case he simply does not operate the handle 43 upon reaching it.

The turntable thus described in either of its embodiments is delivered to the user's premises in preassembled major components—the two runways, the centre frame assembly, and the slewing ring, segment bar and base plate assembly. The baseplate and brake assembly is fixed to the prepared surface, followed by the centre frame. The runways are then attached. Each major component is capable of being handled by two men, so that no heavy lifting equipment is required.

While the invention has been described in relation to preferred embodiments, it will be appreciated that these are given by way of example only, and the invention is capable of embodiment in other forms.

I claim:

1. A motor vehicle turntable comprising rotatable vehicle support means the axis of rotation of which is inclined relative to othogonal vertical planes and brake means for arresting the rotation of said turntable, characterized in that said brake means comprises detent engagement means at spaced arcuately disposed locations concentric with said axis, said engagement means being slots formed at spaced intervals around the periphery of an arcuate member that is mounted for limited rotation about said axis, and detent means rotating with the turntable for braking engagement with said engagement means, said detent means comprising two lug means for engaging said slots, said lug means being diagonally opposite each other and mounted on levers which are spring biased toward said arcuate members.

2. Apparatus according to claim 1 wherein said brake means further comprises release means connected with said lever means to move said lever means away from said arcuate member.

3. Apparatus according to claim 2 wherein said release means comprise trip means on said turntable in the path of a wheel of said vehicle.

4. Apparatus according to claim 2 wherein said release means comprise operating handle means located so as to be operable by the driver of said vehicle when said vehicle is positioned on said turntable.

5. Apparatus according to claim 1 further comprising resilient means urging said member in the direction opposite to the direction of rotation of said turntable.

6. Apparatus according to claim 5 further comprising motion damping means connected with said member.

7. Apparatus according to claim 1 further comprising a base member for mounting said turntable on a substantially level surface, said base member comprising a plurality of base support members for contact with said surface, the length of each said support member differing and determining the inclination of said axis.

8. Apparatus according to claim 1 further comprising a base member for mounting said turntable on a substantially level surface and bearing means mounted on said base member, said arcuate member being mounted between said base member and said bearing means.

9. Apparatus according to claim 8 wherein said bearing means is attached to said base member by a plurality of bolts distributed about said axis, said arcuate member having a radial member affixed thereto, said radial member being engageable against said bolts to limit the extent of rotation of said arcuate member.

* * * * *